Nov. 7, 1967 J. W. WASELESKI, JR., ETAL 3,351,568

PRODUCTION OF SOLID STATE PTC SENSORS

Filed April 13, 1964

2 Sheets-Sheet 1

Joseph W. Waseleski, Jr.,
Harry M. Landis,
Inventors.
Koenig, Senniger, Powers and Leavitt,
Attorneys.

Nov. 7, 1967 J. W. WASELESKI, JR., ETAL 3,351,568

PRODUCTION OF SOLID STATE PTC SENSORS

Filed April 13, 1964 2 Sheets-Sheet 2

3,351,568

PRODUCTION OF SOLID STATE PTC SENSORS

Joseph W. Waseleski, Jr., Mansfield, and Harry M. Landis, Norton, Mass., assignors to Texas Instruments Incorporated, Dallas, Tex., a corporation of Delaware Filed Apr. 13, 1964, Ser. No. 359,370
10 Claims. (Cl. 252—520)

This invention relates to the production of solid-state sensors, and with regard to certain more specific features, to the production of electrical sensors of this class having positive temperature coefficients of resistance (PTC sensors).

Among the several objects of the invention may be noted the production of low-cost but superior PTC sensors made from barium-titanate or related perovskite materials, said sensors having from batch to batch reproducible, well-defined and uniform properties; the provision of means for obtaining sensors of the class described, the surface layers of which are uniform with their interiors, so that they do not depend upon the forms of their surface layers for their control properties and may therefore be modified in size and shape in any manner required; the provision of sensors of the class described having resistivities which are much lower at all temperatures than those produced by conventional procedures; and the provision of PTC sensors in which the percentage change in resistance per degree change in temperature is much greater than heretofore in the so-called break-point range which occurs near the Curie point of the material, and is sometimes referred to as the PTC anomaly. Other objects and features will be in part apparent and in part pointed out hereinafter.

The invention accordingly comprises the ingredients and combinations of ingredients, the proportions thereof, steps and sequence of steps, and features of composition and manipulation, which will be exemplified in the methods and products hereinafter described, and the scope of which will be indicated in the following claims.

Figure 1:
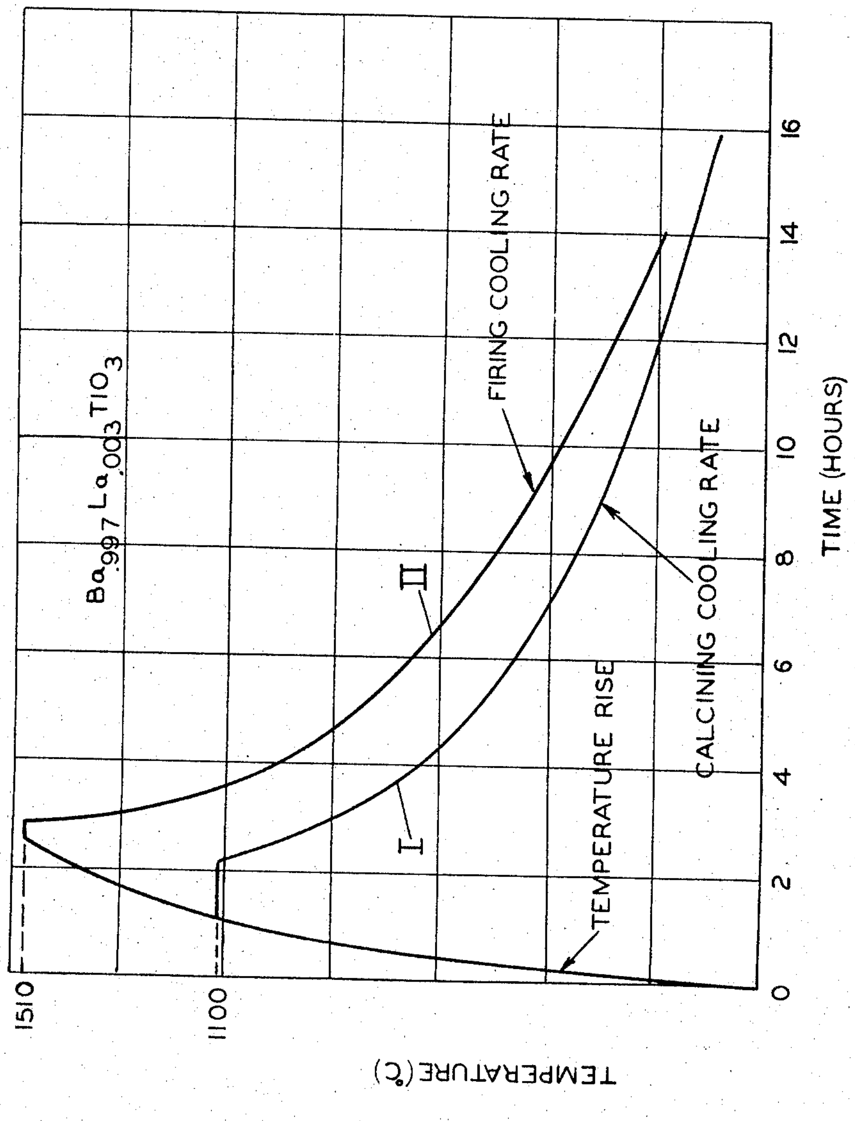
Figure 2:
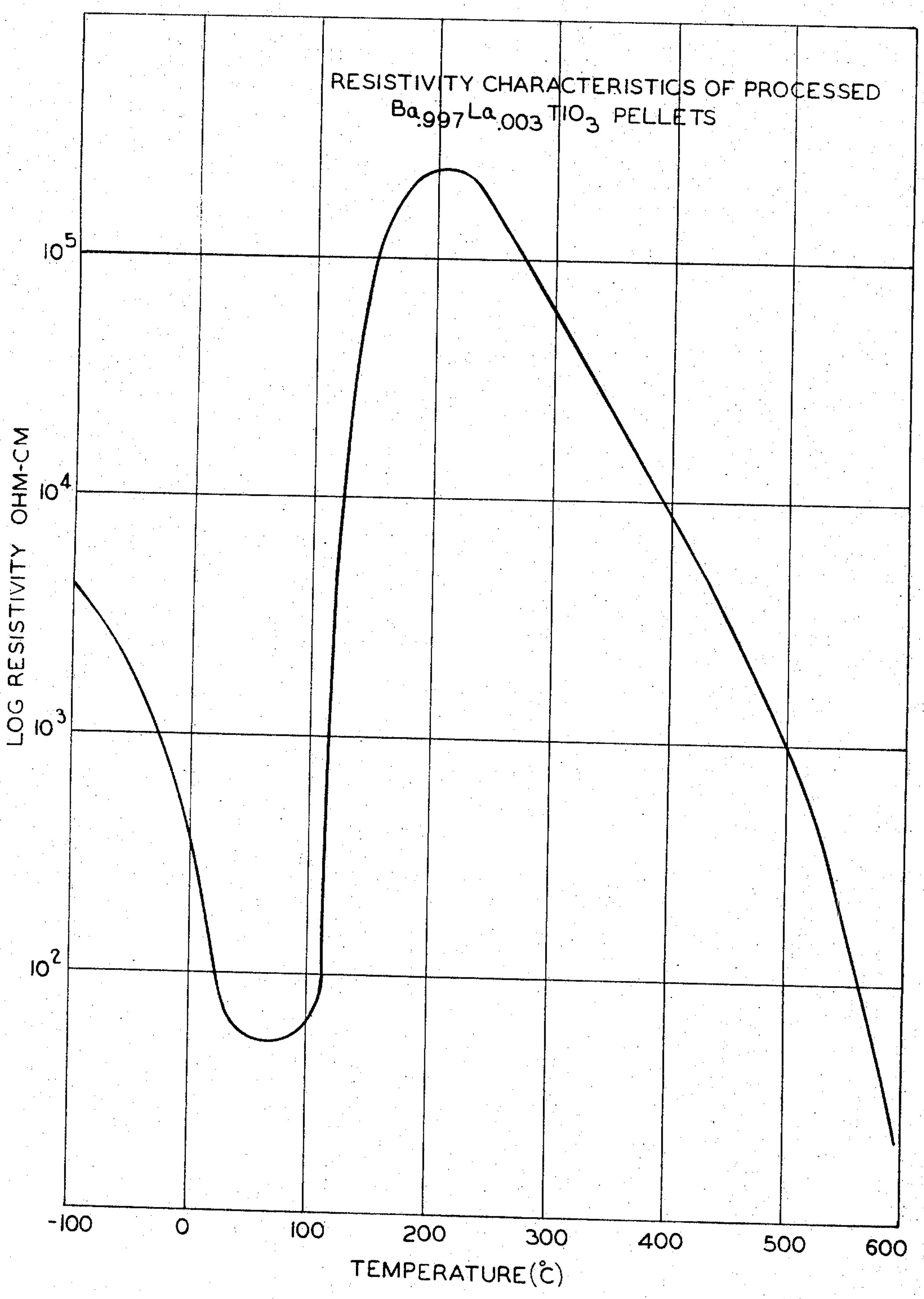

In the accompanying drawings, FIG. 1 is a time-temperature chart for certain heating operations and FIG. 2 is a chart plotting logarithms of resistivity against temperatures of the improved product made according to the invention.

The chemical composition or system defined by $Ba_{1-x-y}M_yLa_xTiO_3$ is one having a perovskite structure and a large puositive temperature coefficient (PTC). In this system the range of values that $y$ may take includes zero. Lanthanum ($La_x$) is a dopant. $M_y$ represents small additions of strontium or lead which may or may not be employed. These small additions of metal, if used, have the effect of increasing or decreasing the temperature range of the break point, for example from 0° C. to 265° C., depending upon the amount and kind of metal added. Barium-titanate ($BaTiO_3$) is the basic material of the system which, without the metal additive, may be designated $Ba_{1-x}La_xTiO_3$.

A composition defined by $Ba_{.997}La_{.003}TiO_3$, for example, has a break point at 115° C. In this case, $y$ is zero. This material ($Ba_{.997}La_{.003}TiO_3$) will be used hereinafter as an illustrative example, but it will be understood that related materials may be used within the scope of the invention.

We have discovered that improved sensors can be obtained from a system such as above mentioned by more effective control of moisture adsorption by the constituent materials of the sensors, prior to final pressing and firing, than was heretofore obtained by means of humidity-controlled rooms or the like. This also makes possible the production of sensors which are uniform in their resistance-temperature relations throughout their entire volumes. This is apparently due to the fact that the moisture content prior to firing is so low that variations in moisture loss during firing from regions at various depths below the sensor surfaces are vanishingly small. Therefore, the so-called local atmosphere within a pressed sensor, during firing, is essentially uniform, resulting in uniformity of properties throughout the whole volume of the fired and finished sensor.

Another important feature of the invention is the use of a high firing temperature with a short soak time at firing temperature. This enhances the rapid formation of relatively large crystallites in the material but, because of the short time involved at the elevated temperature, large amounts of uncontrolled fusion cannot occur. This also favors greater internal homogeneity and uniformity in the product than was heretofore possible to attain.

An example of our procedure employed for the composition $Ba_{.997}La_{.003}TiO_3$ is as follows:

The raw materials used are reagent grades of barium carbonate ($BaCO_3$), lanthanum carbonate $$La_2(CO_3)_3{:}5H_2O$$

and titanium dioxide ($TiO_2$). These are weighed out to an accuracy of about ±.25% to form stoichiometric mixtures, plus 0.1 mole percent excess $TiO_2$ in order to assure the formation of a liquid phase during final firing. These materials are mixed and a sufficient amount of distilled water added to form a 20% solid mixture by weight. They are then ball-milled for at least 36 hours in a polyethylene jar, using solid balls composed of barium-titanate doped in the same manner as the mixture itself, in order to reduce contamination to a minimum. The 36 hour milling time is considerably longer than has been practiced heretofore. Even longer periods are advantageous as, for example, 96 hours.

After the milling-mixing process is completed, the resulting slurry is dried by any suitable method as, for example, by heating for eight hours at approximately 82° C. in air. This dried product is a well-mixed combination of, for example, $BaCO_3$, $La_2(CO_3)_3{:}5H_2O$ and $TiO_2$. At this time it may be powdered. It is then calcined in order to convert the material into the desired doped compound ($Ba_{.997}La_{.003}TiO_3$) by firing it on platinum foil for about one hour at approximately 1100° C. in air, and then cooled (see curve I on the drawing). The material, after this operation, is in the form of a porous cake, similar in texture and appearance to soft blackboard chalk. The material is then broken up with a mortar and pestle and again wet-milled with distilled water for at least eight hours and as much as forty-eight hours. The material is then again dried, after which it is comminuted and sieved from +40 to −270 (U.S. Standard Sieves). The resulting powder is again immediately dried and so maintained in a suitable manner, as for example by vacuum drying or heating, to drive off any moisture which might have been adsorbed during the comminution and sieving. It is important that this drying step immediately follow comminution and sieving to prevent the material from picking up moisture. This immediate drying is important, for we have discovered that the material, in dry form for pressing, is extremely susceptible to moisture adsorption and, contrary to normal expectations, cannot be entirely removed. Moreover, this adsorbed moisture if permitted is not entirely driven out of the pressed pellets during the firing operation, even when the firing temperature is made high. Further, we have found that any substantial residual moisture retained in the pressed pellets has a significant and degrading effect on the properties of the fired product. Therefore the material is kept in the dry condition until just prior to pressing into pellets. To ensure substantial dryness of the material to be pelletized, we heat the material to a temperature well above the boiling point of water, which under sea level atmospheric pressure would be in the range of 115° C. to 125° C. This heating is performed in air and continued for such a period that moisture ceases to be given up by the material under the stated temperature conditions. A typical resulting moisture content is .01%. Thereafter, before the material, completely dried as stated, has had a chance to cool below the boiling point of water, which is to say about 100° C., it is transferred to the pelletizing press and pelletized. This is before the material thus dried has had an opportunity to adsorb moisture. The press pelletizes at pressures from 1000 p.s.i. to 5000 p.s.i. Pressures less than 1000 p.s.i. result in undesirably large degrees of shrinkage. Pressures greater than 5000 p.s.i. are undesirable since they cause laminations and cracking.

After removal from the press, the pellets are fired, in air, on platinum foil in a furnace at a temperature in the range of approximately 1475° C. to 1550° C. for a short period on the order of 15 minutes or less. This temperature forms a liquid phase in the pellets. They are then allowed to cool in the furnace at the normal cooling rate to room temperature. This is shown by curve II in the drawing.

Sensors made of a given substance according to the invention attain 150% or so rise in resistance per degree C. at the break point; whereas sensors as formerly made attained only 60% or so rise in resistance per degree C. at the same point.

While we do not wish to be bound by any particular theory as to why our improved results are obtained, we believe that the grain boundaries and adjacent regions of the crystallites in the final product play an important role. It is known that single-crystal barium-titanate, doped in the same manner as the polycrystalline material, has no PTC anomaly, and further, that it has a much lower resistivity than the polycrystalline material. It is further well known that the properties of the polycrystalline material, particularly the portion adjacent to the outer surface, are susceptible to variation due to variations in the oxygen content of the furnace atmosphere during the firing cycle. We believe that by the use of a higher-than-normal final firing temperature and the production of relatively large crystallites in the finished pieces the number of grain boundaries is reduced, which in turn reduces resistance.

We believe also that by our improvements we have decreased the thickness of the oxygen-modified regions adjacent to the grain boundaries by greatly reducing the moisture present. Such moisture apparently reacts with the barium-lanthanum-titanate or other members of the perovskite group at elevated temperatures. As a result of the low moisture content, we have produced a material which exhibits a far sharper PTC discontinuity at the break point or, in other words, exhibits a far greater percentage change in resistance per degree change in temperature than has heretofore been possible.

It will be understood that, after the pellets are made as above described, electrical contacts are suitably attached, as by ultrasonic soldering. FIG. 2 shows typical resistivity characteristics for $Ba_{.997}La_{.003}TiO_3$ pellets when made as above described.

In view of the above, it will be seen that the several objects of the invention are achieved and other advantageous results attained.

As many changes could be made in the above methods and products without departing from the scope of the invention, it is intended that all matter contained in the above description or shown in the accompanying drawings shall be interpreted as illustrative and not in a limiting sense.

What is claimed is:

1. The method of producing electrical solid-state PTC sensors of a material such as $Ba_{.997}La_{.003}TiO_3$ and related perovskite materials comprising milling a stoichiometric mixture of barium and lanthanum carbonates with titanium dioxide, calcining, again milling and thereafter heating the material to a temperature of at least 115° C. to drive off adsorbed moisture, pelletizing the heated material to form pellets before the material has cooled below about 100° C., firing the pellets at a temperature on the order of not less than 1475° C. for a short period of time not exceeding about 15 minutes, and thereafter cooling the pellets.

2. The method of producing electrical solid-state PTC sensors of a material such as $Ba_{.997}La_{.003}TiO_3$ and related perovskite materials comprising wet-milling a stoichiometric mixture of barium and lanthanum carbonates with titanium dioxide, drying, calcining, again wet-milling and thereafter drying the resultnig mixture, heating the dried material to a temperature of at least 115° C. to drive off adsorbed moisture, pelletizing the heated material to form pellets before the material has cooled below about 100° C., firing the pellets at a temperature on the order of not less than 1475° C. for a short period of time not exceeding about 15 minutes, and thereafter cooling the pellets.

3. The method according to claim 2, wherein said mixture includes a metal selected from the group consisting of strontium and lead.

4. The method of producing electrical solid-state PTC sensors of a material such as $Ba_{.997}La_{.003}TiO_3$ and related perovskite materials comprising wet-milling a stoichiometric mixture of barium and lanthanum carbonates with titanium dioxide for a period on the order of 36 hours or more, drying, calcining, again wet-milling and thereafter drying the resulting mixture, heating the dried material to a temperature above the boiling point of water to drive off adsorbed moisture, pelletizing the heated material to form pellets before the material has cooled below about 100° C., firing the pellets at a temperature on the order of not less than 1475° C. for a short period of time not exceeding about 15 minutes, and thereafter cooling the pellets.

5. The method of producing electrical solid-state PTC sensors of a material such as $Ba_{.997}La_{.003}TiO_3$ and related perovskite materials comprising wet-milling a stoichiometric mixture of barium and lanthanum carbonates with an excess of titanium dioxide for a period on the order of 36 hours or more, drying, calcining, again wet-milling and thereafter drying the resulting mixture, heating the dried material to a temperature of at least 115° C. to drive off adsorbed moisture, pelletizing the heated material to form pellets before the material has cooled below about 100° C., firing the pellets at a temperature on the order of not less than 1475° C. for a short period of time not exceeding about 15 minutes, and thereafter cooling the pellets.

6. The method according to claim 5, wherein said mixture includes a metal selected from the group consisting of strontium and lead.

7. The method of producing electrical solid-state PTC sensors of a material such as $Ba_{.997}La_{.003}TiO_3$ and related perovskite materials comprising wet-milling a stoichiometric mixture of barium and lanthanum carbonates with an excess of titanium dioxide for a period on the order of 36 hours or more, drying, calcining, again wet-milling and thereafter drying the resulting mixture, heating the dried material to a temperature of at least 115° C. to drive off adsorbed moisture, pelletizing the heated material at a pressure of not more than 5000 p.s.i. to form pellets before the material has cooled below about 100° C., firing the pellets at a temperature on the order of not less than 1475° C. for a short period of time not exceeding about 15 minutes, and thereafter cooling the pellets.

8. The method according to claim 7, wherein said mixture includes a metal selected from the group consisting of strontium and lead.

9. The method of producing electrical solid-state PTC sensors of a material such as $Ba_{.997}La_{.003}TiO_3$ and related perovskite materials comprising milling a stoichiometric mixture of barium and lanthanum carbonates with titanium dioxide, calcining the mixture, again milling and thereafter heating the material to a temperature above the boiling point of water for a period until substantially no more water is given off, and then pelletizing the dried material before it again adsorbs water, to form pellets, firing the substantially bone dry pellets at a temperature on the order of not less than 1475° C. for a short period of time not exceeding about 15 minutes, and thereafter cooling the pellets.

10. The method according to claim 9, wherein said mixture includes a metal selected from the group consisting of strontium and lead.

References Cited

UNITED STATES PATENTS

| | | | |
|---|---|---|---|
| 2,976,505 | 3/1961 | Ichikawa | 252—521 X |
| 2,981,699 | 3/1961 | Ichikawa | 252—520 |
| 2,985,700 | 5/1961 | Johnston | 252—520 X |

FOREIGN PATENTS

| | | |
|---|---|---|
| 714,965 | 1954 | Great Britain. |

OTHER REFERENCES

Sauer et al., Processing of Positive Temperature Coefficient Thermistors, J. Am. Ceramic Soc., vol. 43, No. 6 (1960) pp. 297–301.

LEON D. ROSDOL, *Primary Examiner.*

J. D. WELSH, *Assistant Examiner.*